United States Patent [19]

Bolivar

[11] Patent Number: 5,215,119
[45] Date of Patent: Jun. 1, 1993

[54] SAFETY CLOSURE FOR STEAM PRESSURE COFFEE MACHINE WATER RESERVOIRS

[75] Inventor: Domingo A. Bolivar, Vizcaya, Spain

[73] Assignee: Oficina De Investigation Agrupada S.A., Guipuzcoa, Spain

[21] Appl. No.: 718,606

[22] Filed: Jun. 21, 1991

[30] Foreign Application Priority Data

Jun. 22, 1990 [ES] Spain ................................ 9001740

[51] Int. Cl.⁵ ............................................. F16K 15/18
[52] U.S. Cl. .................................. 137/523; 137/588; 137/599; 251/83
[58] Field of Search ............... 137/587, 588, 519, 522, 137/523, 599; 251/83, 82

[56] References Cited

U.S. PATENT DOCUMENTS

| | | | |
|---|---|---|---|
| 1,541,757 | 6/1925 | Allen | 251/83 X |
| 1,884,991 | 10/1932 | Gerdts | 251/82 |
| 3,495,622 | 2/1970 | Rose | 137/588 |
| 3,987,812 | 10/1976 | Nelson | 251/83 X |

*Primary Examiner*—Stephen M. Hepperle
*Attorney, Agent, or Firm*—Helfgott & Karas

[57] ABSTRACT

A safety closure for a water reservoir of a coffee maker includes a disc-shaped stopper fitted to a wide hole formed in a mouth of the water reservoir. A rod projecting upwards from the hole and extending through a guide bush with a play is connected to the stopper. The guide bush is mounted coaxially to the hole. The stopper tends to a closed position due to pressure in the water reservoir if such exists, and also due to the action of a spring which urges the rod upwards, either directly or through an arm or a push-button which must be pressed by hand in order to open the valve during the filling operation, the latter being made easier by a funnel which can be sealed with a cover.

5 Claims, 4 Drawing Sheets

5,215,119

SAFETY CLOSURE FOR STEAM PRESSURE COFFEE MACHINE WATER RESERVOIRS

BACKGROUND OF THE INVENTION

The present invention relates to a safety closure specifically designed for water reservoirs used to provide coffee machines with pressurized steam.

It is a known fact that steam pressure coffee machines have a water reservoir for obtaining steam, which is duly connected in industrial coffee machines to the general water supply system but household coffee machines must be filled with water manually, before making coffee, through the relevant mouth leading into such reservoir.

More specifically, when opening the coffee machine reservoir for refilling with water, the procedure is in principle inconvenient since the reservoir's safety closure systems are currently screw stoppers which, on the removal from the coffee machine under operating pressure, might permit a jet of water steam to spurt out, with the risk this represents to the user who may be burnt.

In an attempt to overcome this problem, the applicant has suggested a safety mechanism in his Spanish patent 540,281 and certificate of addition thereof 8700605. The safety mechanism disclosed in the Spanish patent eliminates the above-mentioned risk. More specifically, the solution adopted to such end provides that the water reservoir is equipped with a screw stopper, the periphery of the mouth of which stopper has a plurality of recesses which can house a rod that tends to enter into any of the same urged by the actual pressure inside the reservoir, so that until such pressure falls below a given security level, which is not hazardous, the stopper cannot be removed, and hence the reservoir cannot be opened.

However, two problems have occurred in the afore-discussed safety mechanism, one problem being that it is inconvenient to fill the reservoir, because the stopper must be unscrewed and then screwed again which would involve two slow procedures with the first being frequently more difficult because the stopper connection to the mouth of the reservoir is excessively tight, and the other problem being that failure of the stopper's blocking rod would leave the coffee machine's water reservoir without protection.

SUMMARY OF THE INVENTION

It is an object of the present invention to provide a safety closure which would avoid the above problems, allowing the water reservoir to be filled very quickly and simply, and moreover eliminating the aforesaid risks, because in the event of the mechanism failing, the reservoir would not close but in no event; be opened under pressure.

The above objects are attained by one safety closure which provides the mouth of the reservoir with a rather wide one-way valve that tends to be closed by a spring outside the same, which valve is fitted with a hand-driven valve opening element, that can be formed by a spring, the assembly being housed in a neck extending from the mouth of the reservoir, either in one piece therewith or with an associated part, forming a funnel that makes it easier to pour water into the reservoir and is preferably flush with the body of the coffee machine, and that will in turn be sealed by a small cover that embellishes and rounds off the appearance of the apparatus rather than being a sealing cover as such.

In a preferred embodiment of the invention, the spring that tends to close the one-way valve is formed by a manual valve opening element. The spring comprises a band that diametrically crosses the "funnel", one of its ends being attached to the funnel and the middle area thereof having a hole through which a screw connecting the band to the one-way valve stopper passes, so that, upon manual actuation of the free end of the band the stopper moves to the open position merely be gravity, which will obviously only occur when there is no pressure inside the water reservoir or such pressure is sufficiently small in order not to be able to keep the stopper closed, against its own weight, under which circumstance opening of the reservoir will represent no risk to the user of the coffee machine.

According to another characteristic of the invention, the screw locked together with the stopper can be urged permanently through its head, by means of a non-resilient arm in place of the aforementioned band, which arm swings against the force exerted by a spring duly attached thereto.

It is also possible for the spring tending to close the valve to be coaxially mounted on the rod, supported by the guide bush provided to such end and also by a push-button connected to the free end of the rod, so that if the spring is pressed manually, the valve is opened, but only whenever there is no pressure inside the reservoir and, hence, such pressure would not exert a force upon the valve stopper in opposition to the manual urge on the push-button.

DETAILED DESCRIPTION OF THE PREFERRED EMBODIMENTS

Figure 1:
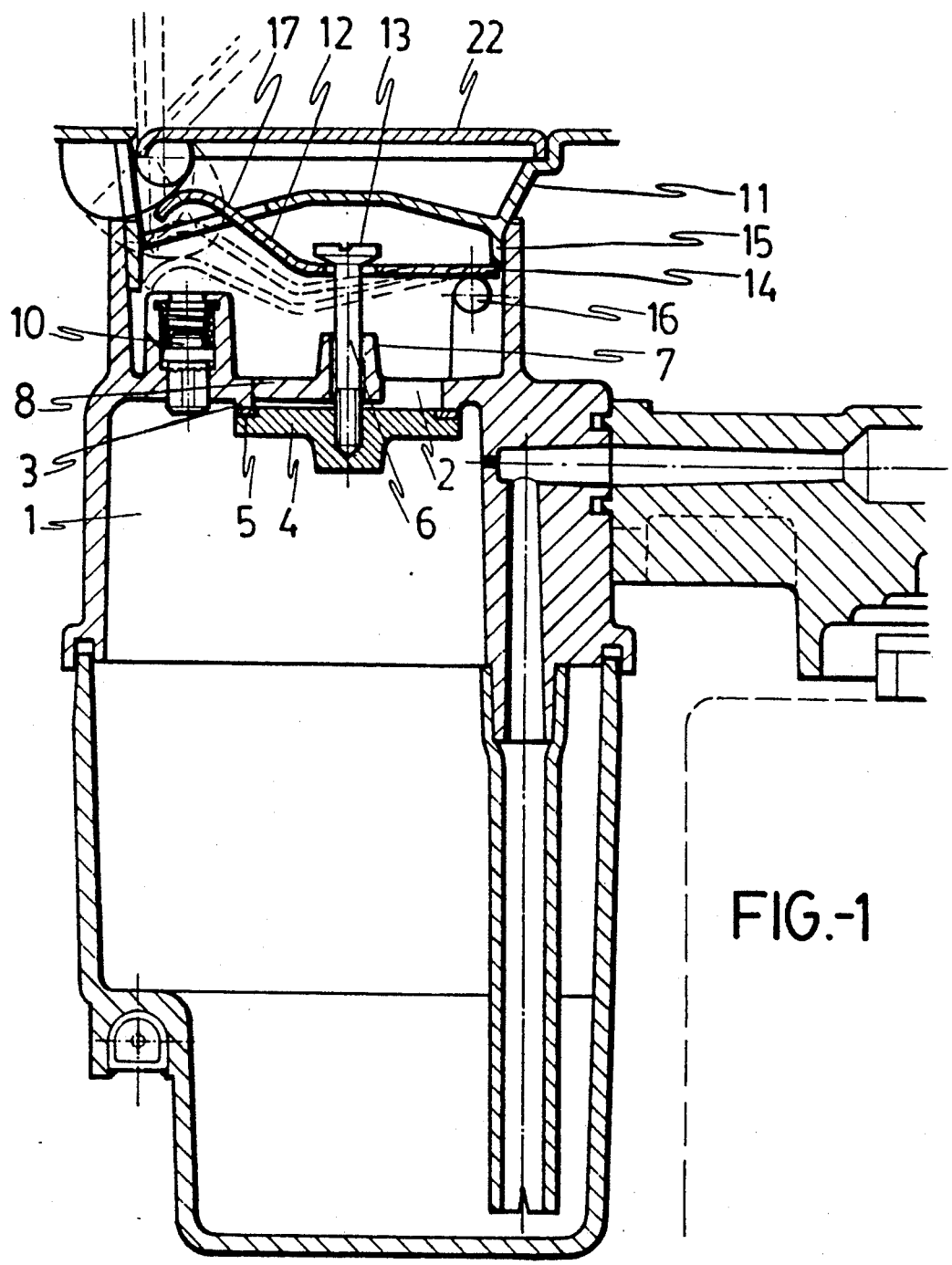
FIG. 1 is a partial sectional side view of a steam pressure coffee machine fitted with a safety closure for its water reservoir, in accordance with the the present invention.

Referring to the drawings it can be seen that the safety closure comprises a one-way valve provided at the top of the coffee machine's water reservoir (1). The one-way valve is formed by a rather wide hole (2) with an ledge (3) supporting a disk-shaped stopper (4) having a peripheral joint (5). The stopper (4) is coaxially fitted with a rod (6), which is preferably a screw being screwed to the stopper, pointing outwards and duly guided by a bush (7) coaxial with the hole (2) and fixed to the mouth of the water reservoir by means of spaced radial arms (8).

The body of the reservoir (1) extends beyond the one-way valve (2-4) into a neck (9) which houses a conventional pressure-relief valve (10) and has its mouth fitted with an associated funnel (11) designed to make filling of the reservoir (1) easier by pouring water into the same.

In any event, the one-way valve stopper (4), that tends to be closed by the steam pressure in the reservoir (1), also tends always towards, such a closed position, even if there is no pressure in the reservoir (1), due to a spring, which will be explained below.

The spring in accordance with the embodiment of FIG. 1, includes a band (12) traversed by the rod (6) which is urged thereby through its head (13). If the rod (6) is a screw, as shown in the said FIG. 1, one of the ends (14) of the band (12) is fixed to the reservoir body, for instance between the funnel edge (15) and a transverse pin (16), its free end having a curvo-convex sector (17) making it easier to tighten the same manually for the valve to open when the water is poured in and for the stopper (4) to take up the position of FIG. 1 in which the band (12) would be at its lower deformation limit, as shown by the dotted line of the figure, in which position the stopper (4) moves down, i.e., it opens merely by gravity, when there is no pressure inside the reservoir (1) so that opening of the reservoir represents no risk to the user of the office machine.

Figure 2:
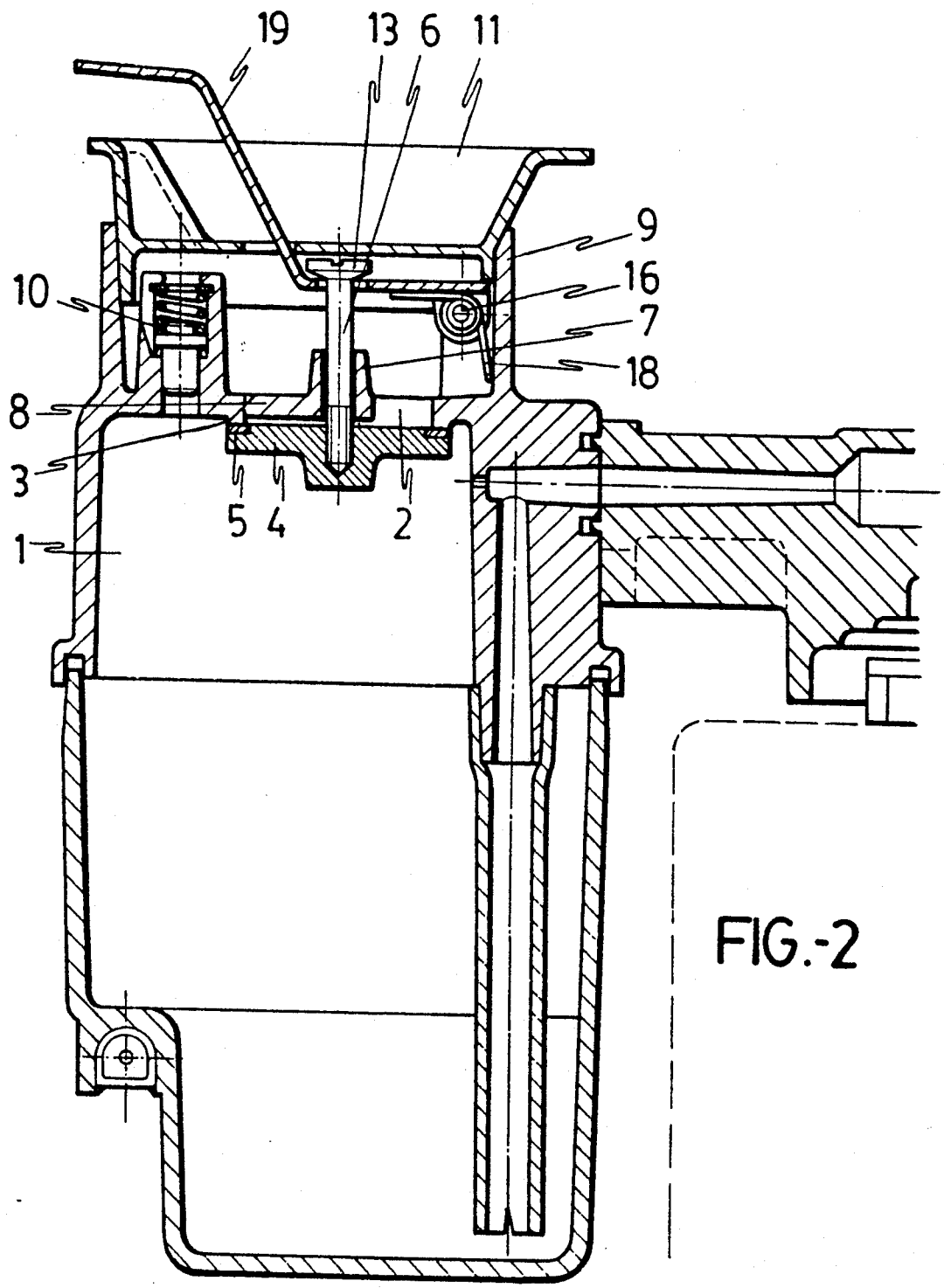
FIG. 2 is a view similar to that of FIG. 1, with the element recoiling the stopper to the closed position slightly modified.

In accordance with the embodiment of FIG. 2, a band or spring (18) can be mounted upon the pin (16) to act on a stiff arm (19) which is equivalent to the band (12) of the previous embodiment, but has no elastic properties which are in this case provided by the spring (18).

Figure 3:
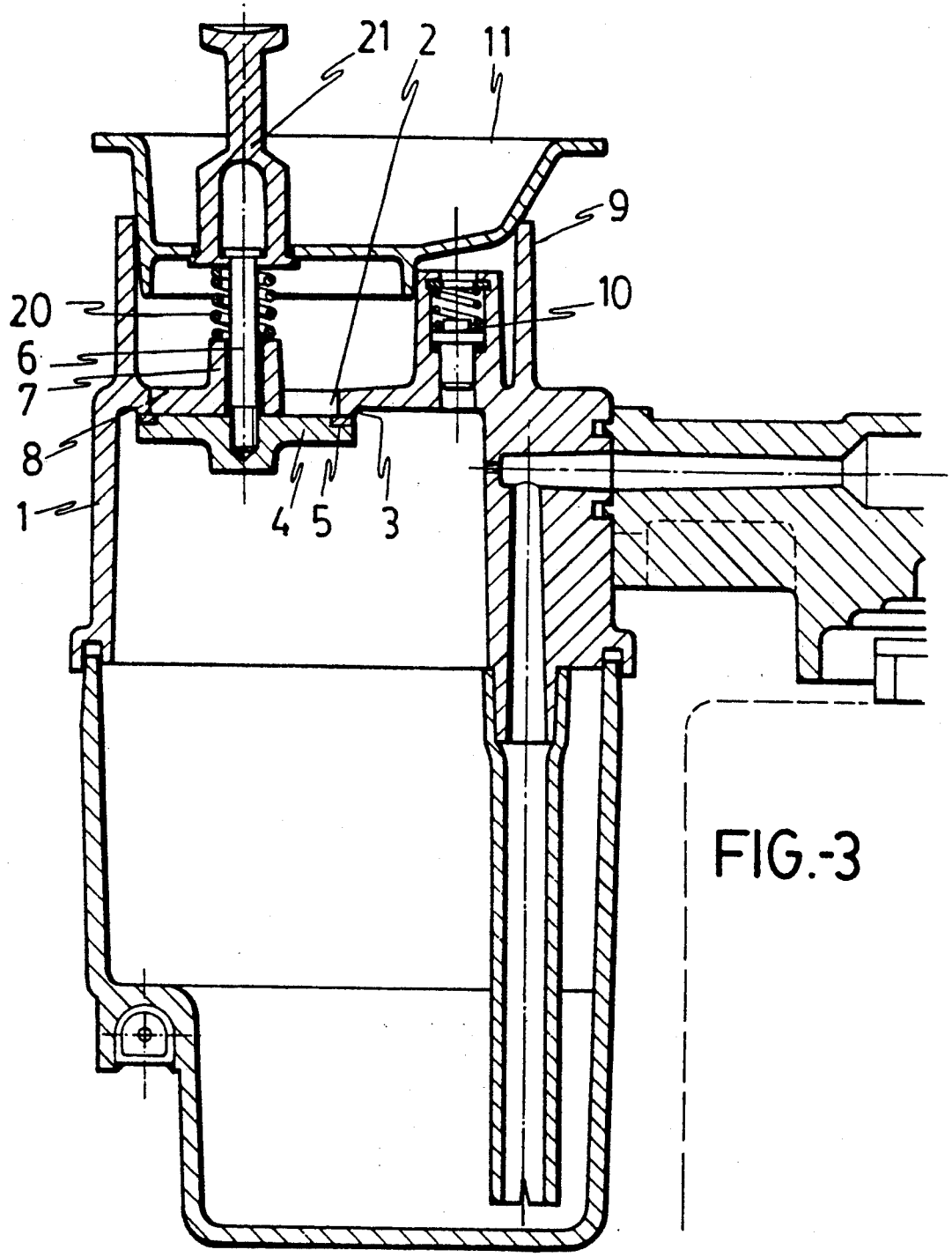
FIG. 3 is a partial sectional side view similar to those of the above figures, with a modified valve stopper recoil spring.
Figure 4:
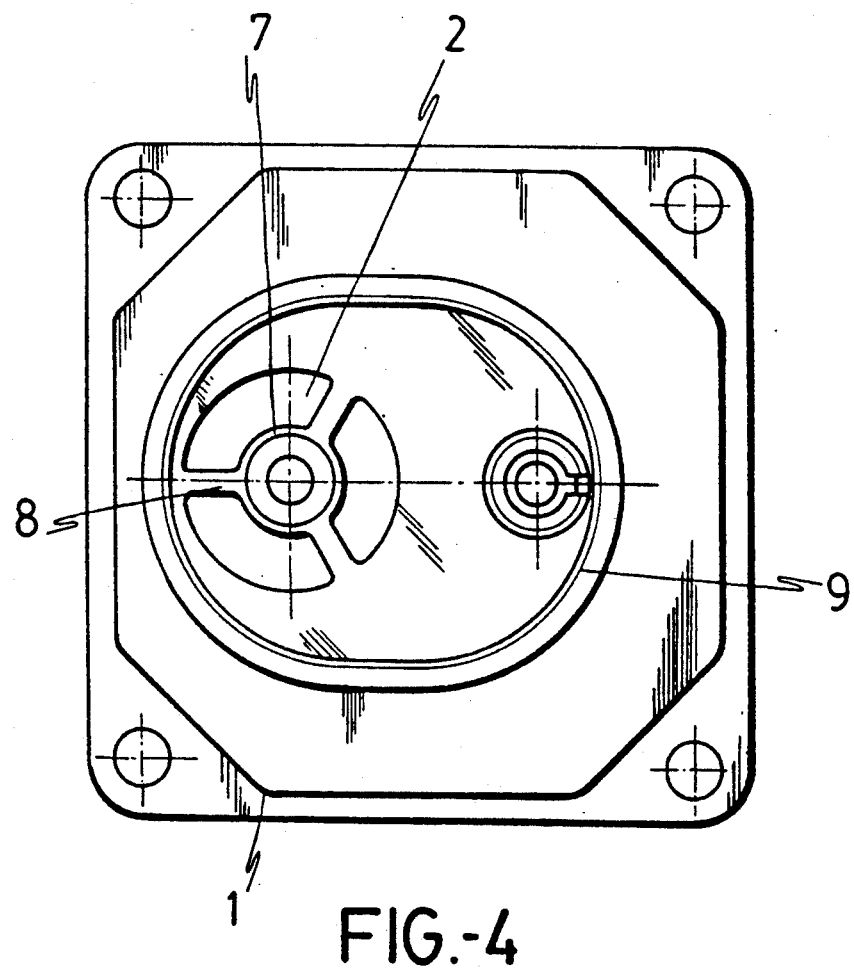
FIG. 4 is a plan view of the safety closure of FIG. 3, without the funnel.

In accordance with the embodiment shown in FIGS. 3 and 4, a spring (20) is coaxially mounted on the rod (6), one of the ends of spring (20) being supported by the end of the guide bush (7) and the other end being supported by a head or push-button (21) for the stopper (4) to be driven by hand. The spring (20), as can be seen clearly in the said FIG. 3, tends to keep the stopper (4) closed, nevertheless allowing the same to open or move down when the push-button (21) is acted upon manually and when there is no pressure inside the reservoir (1) opposing the manual pressure end preventing action.

The funnel (11) can be kept open, as shown FIGS. 2 and 3, or can be closed with an auxiliary cover (22), as shown in FIG. 1 that rounds off the external appearance of the body of the coffee machine body as a whole, but which has no real closure function, as explained above.

In any event the opening takes place extremely quickly and simply since it is sufficient to act upon the band (12), the arm (19) or the push-button (21) for the coffee machine's reservoir to be very easily filled with the necessary amount of water because of the provision of the funnel (11).

It is believed that the device has now been described at sufficient length for any person skilled in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. Safety closure for a water reservoir of a steam pressure coffee machine, comprising a conventional relief valve, a one-way valve formed by a considerably wide hole provided on a top portion of the water reservoir and a disk-shaped stopper, a rod which is connected to the stopper and projects to the outside of said hole, a guide bush coaxial with said hole and having radial arms connected to a periphery of said hole, said rod extending through said bush which a play, and a spring associated with said rod, said stopper being constructed to tend at all times to take up a closed position due to water pressure in the reservoir whenever such pressure actually exists, and to said spring which drives said rod towards the outside and which is compressed when the reservoir is filled.

2. Safety closure as in claim 1, wherein said spring is a band, and a top free end of the rod is connected to said stopper and has an expanded head which abuts against a top surface of said band, said band having a hole in the middle thereof to receive said rod therethrough, one of ends of said band being joined to a neck which extends from the top of the water reservoir, and another free end of said band defining an area for a manual actuation thereof to open the valve.

3. Safety closure as in claim 1, further comprising a rigid arm, the rod connected to the stopper traversing said rigid arm, one of ends of said arm forming an area for valve opening, and the other end of said arm being hinged to a neck of the reservoir and having said spring which tends to swing said arm towards the closed position of the one-way valve.

4. Safety closure as in claim 1, wherein said spring is a helical spring coaxially mounted on the rod connected to the stopper, a lower end of said spring being supported by said guide bush and an upper end of said spring being supported by a push-button associated with an upper end of said rod which is displaceable downwards, upon pressing the push-button by hand in opposition to an action of said spring, thereby opening the one-way valve.

5. Safety closure as in claim 1, further comprising a funnel coupled to a mouth of a neck of the water reservoir above the one-way valve, said funnel enabling pouring water into the reservoir, means for opening the valve being provided within the funnel, and a cover coupled to the mouth and provided to round off an external appearance of the safety closure.

* * * * *